Aug. 13, 1963 W. CHAMBERLIN 3,100,353
GLOBE SUPPORT AND MEASURING DEVICE
Filed March 17, 1961 3 Sheets-Sheet 1
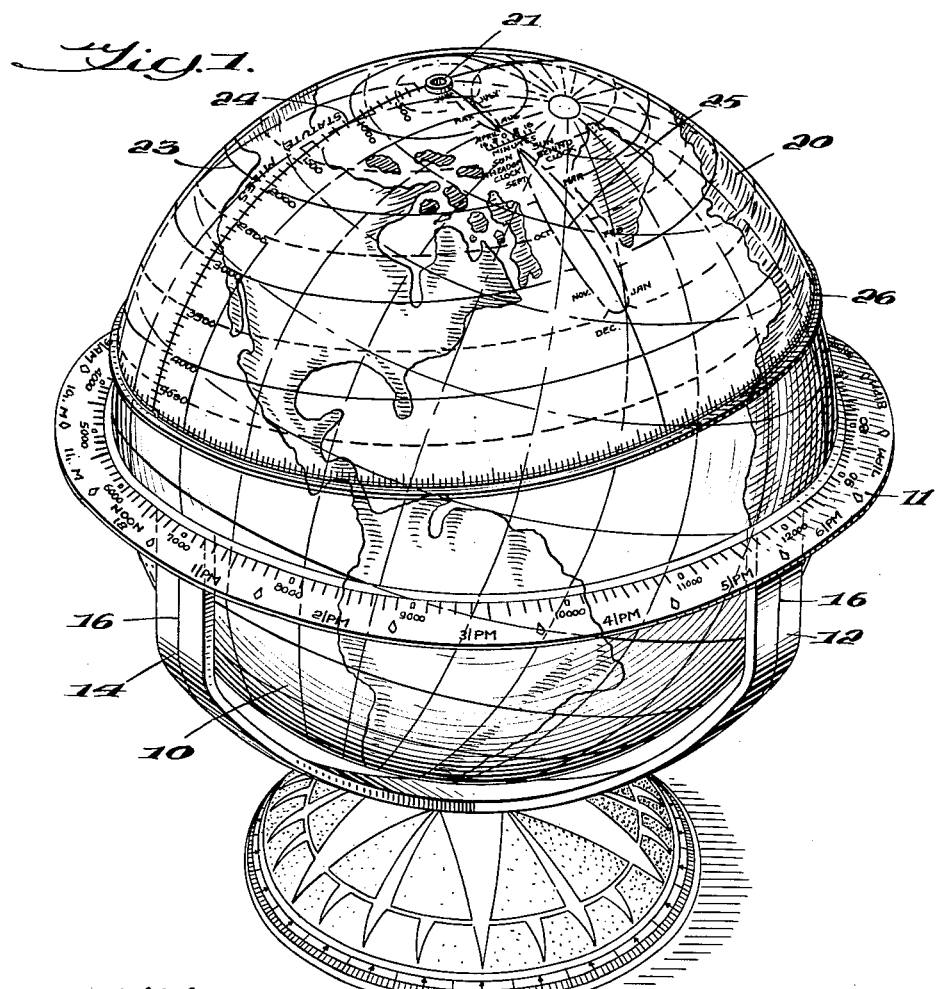
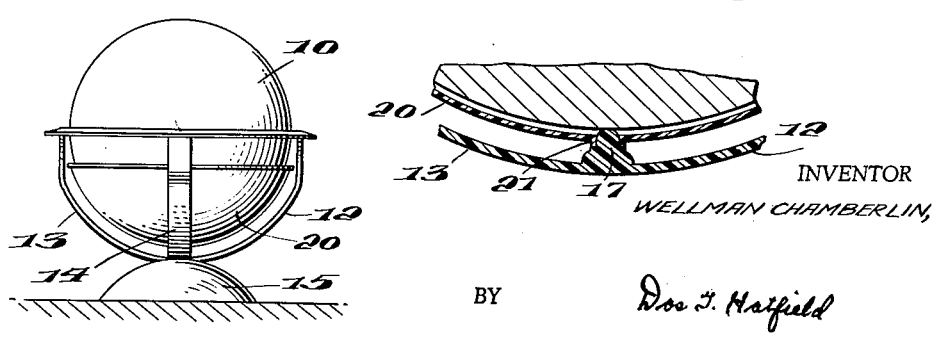
INVENTOR
WELLMAN CHAMBERLIN,
BY
ATTORNEY Aug. 13, 1963    W. CHAMBERLIN    3,100,353
GLOBE SUPPORT AND MEASURING DEVICE
Filed March 17, 1961    3 Sheets-Sheet 2

INVENTOR
WELLMAN CHAMBERLIN,

BY    Don J. Hatfield

ATTORNEY

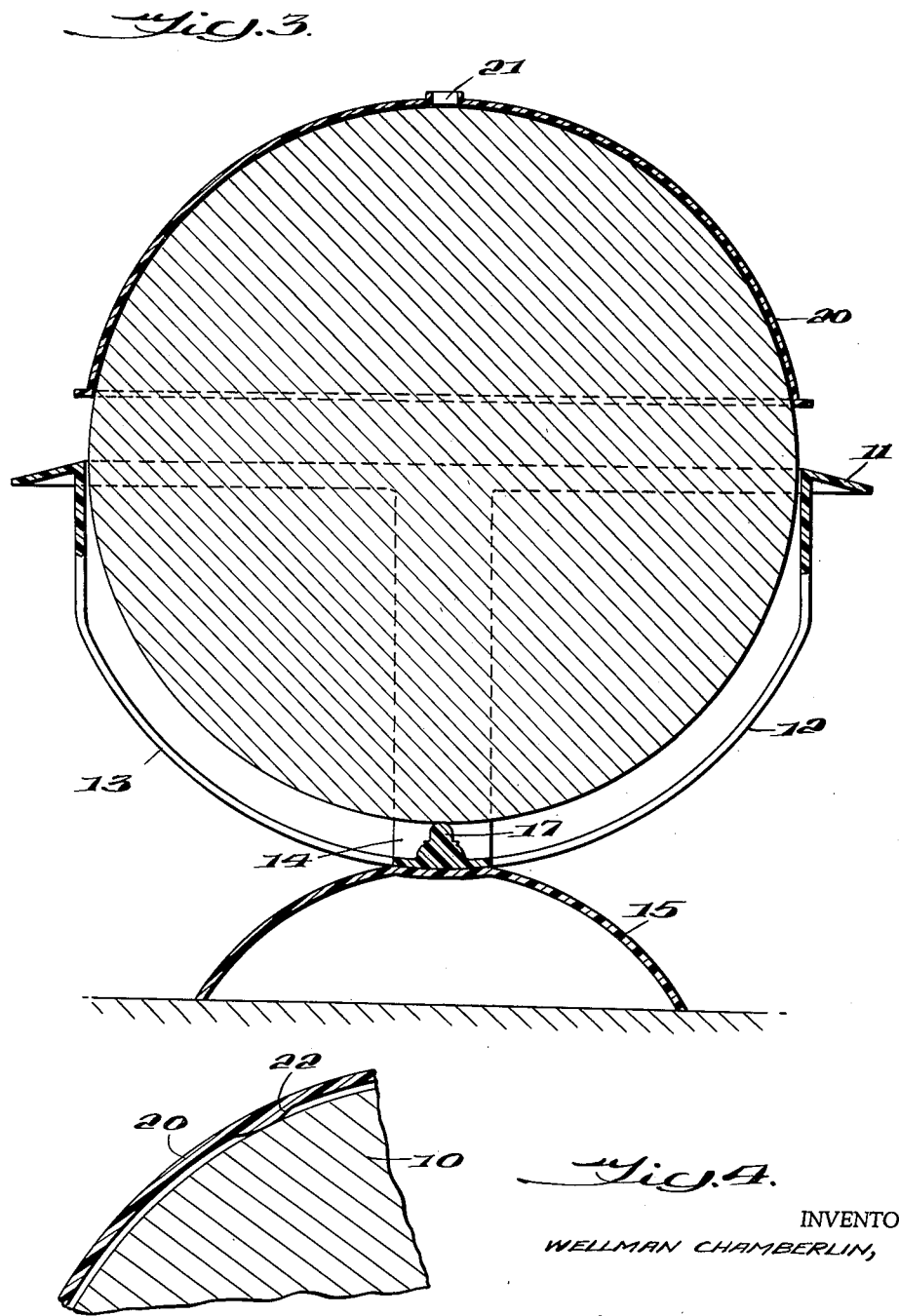

United States Patent Office 3,100,353
Patented Aug. 13, 1963

3,100,353
GLOBE SUPPORT AND MEASURING DEVICE
Wellman Chamberlin, Waterford, Va., assignor to National Geographic Society, Washington, D.C., a corporation of the District of Columbia
Filed Mar. 17, 1961, Ser. No. 96,442
5 Claims. (Cl. 35—46)

The present invention relates to educational devices and more particularly to globe assemblies representing the earth.

There are many well-known forms of globe assemblies useful for geographical study of the earth. There are also many forms of globe arrangements especially adapted to solve navigational problems as well as geographical problems. With the present-day increased interest in world geography, as well as the explorations in space, there is greatly increased demand for world globe assemblies having measuring arrangements to solve a very great variety of geographical, astronomical and navigational problems not only in relation to the surface of the earth but also in relation to the space and universe surrounding the earth.

It is a principal object of the present invention to provide an improved world globe arrangement having measuring devices to facilitate the measurement or solution of a great many problems, both navigational and geographic.

Another object of the invention is to provide a new form of world globe assembly that may be used to solve problems concerning the passage of a satellite in orbit around the earth.

Another object of the invention is to provide an improved world globe assembly with greatly enhanced usefulness and with improved appearance both in display storage and in use.

A further object of the present invention is to provide an improved measuring device for use with globe assemblies to facilitate the measurement of surface distances, comparison of surface areas, plotting and prediction of satellite orbits and the ilke.

Another object of this invention is to provide an improved globe assembly having arrangements and features to facilitate the solution of astronomical problems of the sun, moon, planet and satellite positions as well as over-earth azimuth and distance and the earth's shadow cone extinction lines by height.

In accordance with the invention, a world globe is freely rotatably supported in removable relation on a supporting structure that may include a great-circle ring suitably marked with appropriate indicia. A measuring device which may be comprised of a sheet of hard transparent material is shaped in the form of a spherical segment not greater than a hemisphere having an inner surface radius approximately the same as the radius of the surface of the globe so that the transparent measuring device may be placed to overlie any desired area of section of the globe with the selected globe map portion visible therethrough. The measuring device is provided with suitable indicia thereon which may be seen to overlie the globe map and can be used to indicate surface area, surface distance and other factors, as will be described in more detail. The measuring device may also be provided with a sighting member that is located in a predetermined relation to the other indicia on the device so that the device and indicia may be precisely related to a desired point on the globe surface. Also, the sighting member may preferably take the form of an aperture which receives a suitable projection of the supporting base for the globe so that when the measuring device is not being used, it may be stored in nested relation between the support and the globe. In order to prevent scratching the surface of the globe when moving the measuring device around on the globe surface, slightly raised and smoothly rounded projections are formed on the inner or under surface of the spherical measuring device so as to space the device generally above the surface of the globe when in use. Also, these projections prevent the creation of a suction between the measuring device and globe, so that the device may be moved freely relative to the globe.

Further objects, features and the attending advantages of the invention will be apparent with reference to the following specification and drawings in which:

FIG. 1 is a perspective elevational view of the globe assembly of the invention with the spherical protractor in place to be used;

FIG. 3 is a transverse section through the globe assembly with the spherical protractor positioned in place to be used as shown in FIG. 2;

FIG. 4 is an enlarged fragmentary sectional view showing how the spherical protractor is supported to be freely movable on the globe surface;

FIG. 5 is a simplified elevational view of the globe assembly with the spherical protractor in the stored position, and FIG. 6 is an enlarged fragmentary sectional view of the globe assembly and spherical protractor in stored relation similar to FIG. 5.

Figure 2:
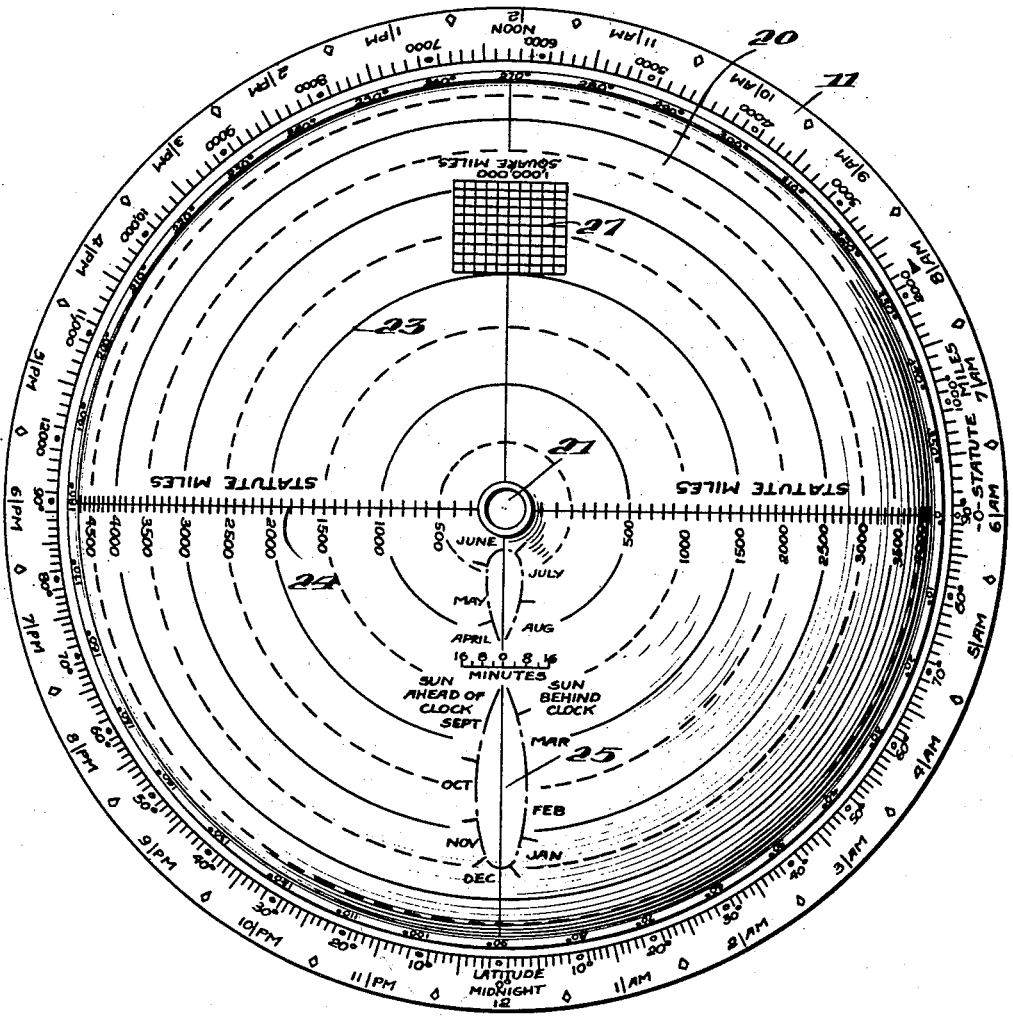
FIG. 2 is a top plan view of the globe assembly of the invention with the spherical protractor centered in place.

Referring to the drawings, the globe assembly is the usual sphere 10 made of any suitable material and having a map of the world on its surface, together with the usual fifteen degree spaced latitude and longitude marking lines. As may be more clearly seen in FIGS. 1–3 of the drawings, the globe 10 is freely rotatably supported within a cradle comprised of a great-circle ring 11 and carried by support members such as shown at 12, 13 and 14 secured to a decorative base 15. Only three of the support riser members 12–14 are clearly shown in the drawings, but it should be understood that at least two of the support members 12 and 13 are diametrically oppositely positioned and the supports may be formed of clear plastic and provided with a vertical line marking such as shown at 16. The line marking 16 will be later described in connection with its suggested usage. The base of the support 15 includes a raised rounded projection 17 upon which the globe may rest to be freely rotatable. It will be noted that the globe assembly thus far described enables the globe 10 to be removably supported and freely rotatably positioned so that it may be rotated to any desired position within the support. The great-circle ring 11 is provided with various indicia including degree markings, statute mile markings, and time zone markings, all of which may be conventional.

In addition to the globe assembly thus far described, the invention includes a spherical protractor 20 which is formed of sheet material, preferably clear plastic, with an inner radius substantially the same as, or slightly larger than, the radius of the globe. Thus the spherical protractor 20 may be positioned on the globe to be moved over any desired surface thereof. As shown in the drawings, the spherical protractor 20 is somewhat less than a hemisphere in size, so that it may be easily positioned on the globe. The spherical protractor 20 is provided with a sighting element or aperture 21 which will enable the spherical protractor, and its markings later described, to be aligned relative to a desired point on the map of the earth on the globe's surface. When not in use, the spherical protractor 20 may be stored, as more clearly shown in FIGS. 5 and 6 of the drawings, at the base of the globe in nested relation between the globe 10 and its supporting base 15. The aforementioned sighting aperture 21 is of sufficient size to receive the projection 17 of the base 15 so that the spherical protractor 20 will be maintained in the nested relation during storage.

As more clearly shown by FIG. 4 of the drawings, the spherical protractor 20 is also provided with a plurality of slightly rounded raised projections 22, only one of which is shown in FIG. 4. These projections, which are spaced at various points within the inner periphery of the spherical protractor 20, serve to raise the general surface of the spherical protractor slightly above the surface of the globe to prevent scratching the globe by the indicia on the protractor as the spherical protractor and globe are moved relative to each other. As mentioned earlier, the projections 22 also prevent the creation of frictional engagement and the formation of a suction between the protractor and globe.

Referring now more particularly to FIGS. 1 and 2 of the drawings, it will be seen that the spherical protractor 20 is provided with a number of indicia or markings. For example, the markings may include almucantar circle markings 23 which are concentric with the sighting aperture 21 and spaced at positions representing 500 miles, to indicate surface distance from the center of the sighting element. In addition, an azimuth line 24 may be provided which intersects the almucantar circles and extends diametrically across the surface of the spherical protractor. The bottom edge of the spherical protractor 20 may be provided with degree markings 26 in both degrees and minutes for precisely locating true direction. Furthermore, the spherical protractor 20 may be provided with analemmatic markings 25 which may be used for purposes to be described. In addition, the spherical protractor 20 is provided with markings indicative of square mile area, and these markings 27 include a plurality of small rectangles, each rectangle representing an area of 100 miles by 100 miles, or 10,000 square miles. With the 100 squares as shown, an area of one million miles is indicated. It is desired to point out again that the spherical protractor 20 is preferably formed of transparent plastic material and that the markings as described are placed on the transparent protractor by any suitable well-known technique such as, for example, etching, embossing or the like. These markings may be colored to increase their visibility if desired.

The globe assembly including the spherical protractor as described may have various uses, some of which will be described herein. It should be understood, however, that the spherical protractor 20 may be used with other globe assemblies, provided, of course, that the inner radius of the spherical protractor suitably matches the radius of the globe with which it is to be used. When the globe 10 is resting in the stand, the great-circle band or ring 11 holds the globe laterally. Since the globe may be brought into any position relative to the great-circle ring 11, great-circle arcs can be measured in any of the units marked on the ring, anywhere on the globe. In addition, the great-circle ring can be used to show the plane of the earth's orbit, or as the terminator in problems involving sunrise, sunset, or the seasons of the year. Furthermore, the fine center line 16 shown on the transparent vertical supports 12 and 13 may be used as a fragmentary great-circle of the globe to point out short arcs of satellite passage or the like.

Since the globe 10 is freely rotatable within its stand, as previously described, the globe is not set on a fixed axis tilted as the earth itself inclines toward the sun. If it is desired to position the globe on such an axis, it is only necessary to turn the globe so that the dotted lines for the Tropics of Cancer and Capricorn both touch the great-circle ring. It should be understood, of course, that the map of the earth as conventionally placed on the globe's surface includes such dotted line indicia.

If it is desired to know the shortest distance between any two points on the globe, which is, of course, the great circle, it is only necessary to line up the two points on the globe so that they both touch the great-circle ring. If one of the points is also placed on the zero mile indication on the great-circle ring then the other mile indication, adjacent the other point to be measured, will indicate the surface distance in statute miles between the two points. If this distance is to be measured in terms of nautical miles, then the degree scale of the great-circle ring would be employed, and it is understood that each degree on the great-circle ring equals sixty nautical miles.

It is not believed necessary to describe in detail how the great-circle ring can be used to determine standard time at any point on the earth, since this is a conventional procedure which would be used in connection with the time and degree markings on the great-circle ring, much in the same manner as has been previously described in determining distance between two points on the earth's surface. It is also not believed necessary to describe in detail how the latitude and longitude markings on the globe and the great-circle ring and support may be used to locate any point on the earth by its latitude and longitude since this procedure is conventional and well-known.

If it is desired to find the antipode for any particular spot on the earth which is, of course, the point on the earth farthest away from the spot on the earth, the great-circle ring may again be used with reference to the degree markings. For example, assume that the spot on the earth for which the antipode is to be determined is Washington, D.C. The globe is rotated to place Washington at a 90° mark on the great-circle ring. The other 90° mark on the great-circle ring will then indicate the antipode which is the point at the exact opposite side of the earth.

The spherical protractor 20 is useful for determining many other problems. For example, the azimuth or true direction from one point to another of the earth's surface may be quickly determined in degrees starting with zero from true North. In order to do this, it is first necessary to center the sighting hole 21 of the spherical protractor 20 over the starting point on the earth's surface. Then the zero line or azimuth line 24 is lined up so that it intersects or points toward the North Pole. Then it is necessary to stretch a string or other similar element from the starting point to the ending point on the earth's surface across the surface of the spherical protractor, and the point that the string crosses the direction scale or degree markings around the edge of the spherical protractor indicates the azimuth in degrees.

The grid scale 27 of the spherical protractor 20 as previously described may be used to estimate area of land or ocean portions of the globe. As previously mentioned, each of the small squares represents an area of 10,000 square miles. If the transparent spherical protractor is placed with the area grids overlying the globe surface to be estimated in area, a glance will show what proportion of the area squares is represented by the surface to be measured. By counting the solidly filled squares and estimating the partly filled squares, an estimate of the actual area to be measured may be readily obtained.

The spherical protractor can also be used to compare area size by tracing the outline of a geographical unit such as a country on the protractor and thereafter moving the protractor relative to the globe to position the traced outline over another geographical unit to compare the relative sizes of the units.

The analemma 25 of the spherical protractor 20 may be used to find the one spot on the earth where the sun is at zenith on any day of the year. For example, assume that the date is April 15 and that the observer is in Washington, D.C. It is desired to know the one spot nearest the sun at noon. The analemma 25 is centered between the lines of the Tropics of Cancer and Capricorn on the earth's surface with the meridian line of the analemma in line with the Washington, D.C., meridian on the globe. The observer then reads along the analemma for the date (April 14) which indicates that the sun is almost directly over the Panama Canal, thus solving the problem. The analemma 25 may be used to solve other problems which will be obvious to those skilled in the art.

The globe assembly of the invention, together with the spherical protractor 20, may also be used for tracking an artificial satellite in orbit, as soon as the satellite enters on a relatively stable path that can be traced on the earth's surface as a great circle. It is only necessary to know the satellite's inclination (or the distance in degrees that it travels north or south of the Equator) together with the time required to complete one orbit of the earth. Given these two factors, the course of the satellite can be predicted. For example, say that the inclination is 60° and the orbit time is one hour and forty minutes. If the satellite passes over Washington, D.C., at noon, the cities over which it will pass on its next orbit can be indicated as follows. First, incline the globe in the great-circle ring 11 so that the ring touches the lines for 60° north, 60° south, and the city of Washington, D.C. The great-circle ring 11 then shows the satellite's orbit over Washington, D.C. However, while the satellite is making one orbit around the earth, the earth itself is turning eastward at the constant speed of one degree every four minutes. By the time the satellite has returned over the United States of America, it will follow a path farther west. By dividing four minutes into 100 minutes to determine how many degrees westward the satellite will be, the answer will be 25°. Now the point where the great-circle ring crosses the Equator as previously aligned indicates 47° west. If the observer will add 25° to 47° he will find that the satellite's next orbit will intersect the Equator at the 72° point. By turning the globe so that the ring now touches both 60° lines of latitude and the 72° west mark on the Equator, the course of the satellite's next orbit over the United States will be indicated, and it will be seen that the satellite comes close to Tulsa, Oklahoma, and New Orleans, Louisiana.

Another use for which the spherical protractor 20 of the invention may be employed is to indicate or estimate the flight radius of an aircraft or military missile. As previously mentioned, the concentric almucantar circles indicate 500-mile spacings. By placing the sighting aperture 21 over the target and knowing the range of the aircraft or missile an instant determination may be made of the point on the globe from which the missile or aircraft could be fired or take off to arrive at the desired target area. If, for example, the missile range is 1500 miles, it could be fired from any point within the third concentric almucantar ring.

The elevational azimuth of the sun may be readily determined for a given point on the earth's surface as follows. First, the standard meridian for the time of the day at the given point is located. Noon will show the meridian of the geographical position of the sun. By putting the analemma on the sun's meridian, the exact geographical position of the sun for the particular date may be determined. By centering the sighting aperture 21 of the spherical protractor on the given point on the globe, the concentric distance circles 23 of the spherical protractor will correspond to the following sun elevations:

| Distance (miles): | Elevations (degrees) |
|---|---|
| 500 | 82¾ |
| 1000 | 75½ |
| 1500 | 68¼ |
| 2000 | 61 |
| 2500 | 53¾ |
| 3000 | 46½ |
| 3500 | 39¼ |
| 4000 | 32 |
| 4500 | 24¾ |
| 5000 | 17½ |

The sun's azimuth is found with the direction lines 24. The same method could be used with any celestial body to find or demonstrate lines of position used in navigation.

If it is desired to find the limits of the earth's shadow cone for satellites at various heights, the globe assembly of the invention may be used as follows. First, the sun's geographical position for the day and time is found, using the analemma on the spherical protractor to determine declination and equation of time, and using the time circles on the great-circle ring 11 to determine the meridian of the sun. Next the antipode of the sun's geographical position is found, using the 90° marks on the latitude scale of the great-circle ring. Then the spherical protractor 20 is centered with its sighting aperture at this antipode of the geographical position of the sun. The concentric distance circles 23 on the spherical protractor will then correspond to the earth's shadow limits for the following heights above the earth's surface.

| Distance from center (statute miles): | Height above surface (Statute miles) |
|---|---|
| 500 | 27,412 |
| 1000 | 11,871 |
| 1500 | 6,733 |
| 2000 | 4,211 |
| 2500 | 2,739 |
| 3000 | 1,796 |
| 3500 | 1,156 |
| 4000 | 711 |
| 5000 | 402 |
| 5000 | 193 |

It will be noted that the inner cup-shaped portion of the base 15 has a radius substantially the same as, or slightly larger than, the radius of the globe. Thus, if the great-circle ring is not to be used in conjunction with the globe and protractor, the stand may be inverted so that the great-circle ring becomes the base and the globe may then be positioned within, and freely rotated relative to, the base 15 and the protractor may then be positioned on the globe in a manner similar to that previously described.

Although various suggested uses for the globe and spherical protractor assembly of the invention have been described, it should be understood that many other uses will occur to those skilled in the art.

Various modifications may be made within the spirit of the invention and the scope of the appended claims.

I claim:

1. An educational globe assembly comprising, a globe having a map of the earth on its surface, a support for said globe having a projection adapted to engage and freely rotatably support said globe in removable relation, and a measuring device formed as a spherical segment not greater than a hemisphere of transparent sheet material having a radius of curvature for its inner surface substantially the same as the radius of curvature of said globe whereby said device may be removably positioned over a desired area of the globe's surface with a selected portion of the earth's map visible therethrough, said device having a sighting aperture for aligning the device in predetermined relation to the selected portion of the map on the globe's surface, said aperture being adapted to receive said projection whereby said device may be stored in nested relation between said support and said globe.

2. An educational globe assembly comprising, a globe having a map of the earth on its surface, a support for said globe having a projection adapted to engage and freely rotatably support said globe in removable relation, and a measuring device formed as a spherical segment not greater than a hemisphere of transparent sheet material having a radius of curvature for its inner surface substantially the same as the radius of curvature of said globe whereby said device may be removably positioned over a desired area of the globe's surface with a selected portion of the earth's map visible therethrough, said device having a sighting aperture for aligning the device in predetermined relation to the selected portion of the map on the globe's surface, said aperture being adapted to receive said projection whereby said device may be stored in nested relation between said support and said globe, said device having a plurality of spaced-apart raised projections on the inner spherical surface to space the surface of said device above the surface of the globe.

3. An educational globe assembly comprising, a globe having a map of the earth on its surface, a support for said globe having a projection adapted to engage and freely rotatably support said globe in removable relation, said support having a pair of diametrically opposed upstanding arms and a great-circle ring of slightly larger diameter than the diameter of said globe supported thereon, and a measuring device formed as a spherical segment not greater than a hemisphere of transparent sheet material having a radius of curvature for its inner surface substantially the same as the radius of curvature of said globe whereby said device may be removably positioned over a desired area of the globe's surface with a selected portion of the earth's map visible therethrough, said device having a sighting aperture for aligning the device in predetermined relation to the selected portion of the map on the globe's surface, said aperture being adapted to receive said projection whereby said device may be stored in nested relation between said support and said globe.

4. An educational globe assembly comprising, a globe having a map of the earth on its surface, a support for said globe having a projection adapted to engage and freely rotatably support said globe in removable relation, said support having a pair of diametrically opposed upstanding arms and a great-circle ring of slightly larger diameter than the diameter of said globe supported thereon, and a measuring device formed as a spherical segment not greater than a hemisphere of transparent sheet material having a radius of curvature for its inner surface substantially the same as the radius of curvature of said globe whereby said device may be removably positioned over a desired area of the globe's surface with a selected portion of the earth's map visible therethrough, said device having a sighting aperture for aligning the device in predetermined relation to the selected portion of the map on the globe's surface, said aperture being adapted to receive said projection whereby said device may be stored in nested relation between said support and said globe and, said device having a plurality of spaced-apart raised projections on the inner spherical surface to space the surface of said device above the surface of the globe.

5. An educational globe assembly comprising, a globe having a map of the earth on its surface, a support for said globe having a projection adapted to engage and freely rotatably support said globe in removable relation, said support having a pair of diametrically opposed upstanding arms of transparent material each having a center line marking thereon and a great-circle ring of slightly larger diameter than the diameter of said globe supported thereon, and a measuring device formed as a spherical segment not greater than a hemisphere of transparent sheet material having a radius of curvature for its inner surface substantially the same as the radius of curvature of said globe whereby said device may be removably positioned over a desired area of the globe's surface with a selected portion of the earth's map visible therethrough, said device having a sighting aperture for aligning the device in predetermined relation to the selected portion of the map on the globe's surface, said aperture being adapted to receive said projection whereby said device may be stored in nested relation between said support and said globe and, said device having a plurality of spaced-apart raised projections on the inner spherical surface to space the surface of said device above the surface of the globe.

References Cited in the file of this patent

UNITED STATES PATENTS

| | | |
|---|---|---|
| 171,472 | Durant | Dec. 28, 1875 |
| 812,408 | Dickerson | Feb. 13, 1906 |
| 887,740 | Phillips | May 12, 1908 |
| 1,532,878 | Bugbee | Apr. 7, 1925 |
| 2,347,658 | Bourne | May 2, 1944 |
| 2,355,304 | Koch | Aug. 8, 1944 |
| 2,546,764 | McHose | Mar. 27, 1951 |
| 2,951,610 | Smalley | Sept. 6, 1960 |

FOREIGN PATENTS

| | | |
|---|---|---|
| 123,526 | Germany | Oct. 3, 1900 |
| 808,938 | France | Feb. 18, 1937 |